United States Patent [19]

Figura

[11] 3,899,040
[45] Aug. 12, 1975

[54] VEHICLE FRAME AND DRIVE TRAIN
[75] Inventor: William L. Figura, Bruce, Wis.
[73] Assignee: Jacobsen Manufacturing Company, Racine, Wis.
[22] Filed: Sept. 18, 1974
[21] Appl. No.: 507,004

[52] U.S. Cl. .............. 180/27; 180/73 R; 180/73 D
[51] Int. Cl.² .................. B62D 61/08; B60K 17/16
[58] Field of Search...... 180/27, 70 R, 71, 72, 73 R, 180/73 D, 89 R

[56] References Cited
UNITED STATES PATENTS

| | | | |
|---|---|---|---|
| 2,233,293 | 2/1941 | Matthews | 180/73 R |
| 2,595,494 | 5/1952 | Stratman | 180/70 R |
| 2,980,196 | 4/1961 | Van Der Brugghen | 180/73 D |
| 3,349,931 | 10/1967 | Wagner | 180/72 X |
| 3,512,599 | 5/1970 | Hott | 180/27 |
| 3,648,795 | 3/1972 | Moulton | 280/DIG. 5 X |

Primary Examiner—David Schonberg
Assistant Examiner—Terrance L. Siemens
Attorney, Agent, or Firm—Arthur J. Hansmann

[57] ABSTRACT

A vehicle frame and drive train with an engine supported by the frame and the drive train including a transmission and a differential and two rear wheel axles, all connected together with drive members extending therebetween. The frame has side beams and cross rails, and a U-shaped pan is supported on the frame and encloses the drive train. The rear wheels are pivotally supported by means of V-shaped members, and the spring resiliently cushions the wheels. The vehicle is shown in the form of a utility truck, and it has a pivotally-mounted box and an operator's seat, and a transmission shift lever is disposed adjacent the seat and has linkage extending to the transmission, and the vehicle is shown to be three wheeled.

10 Claims, 9 Drawing Figures

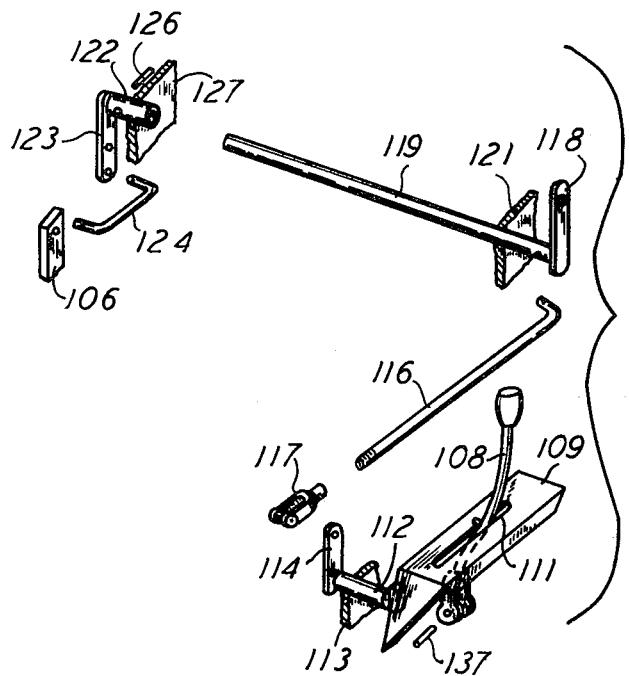
FIG. 7
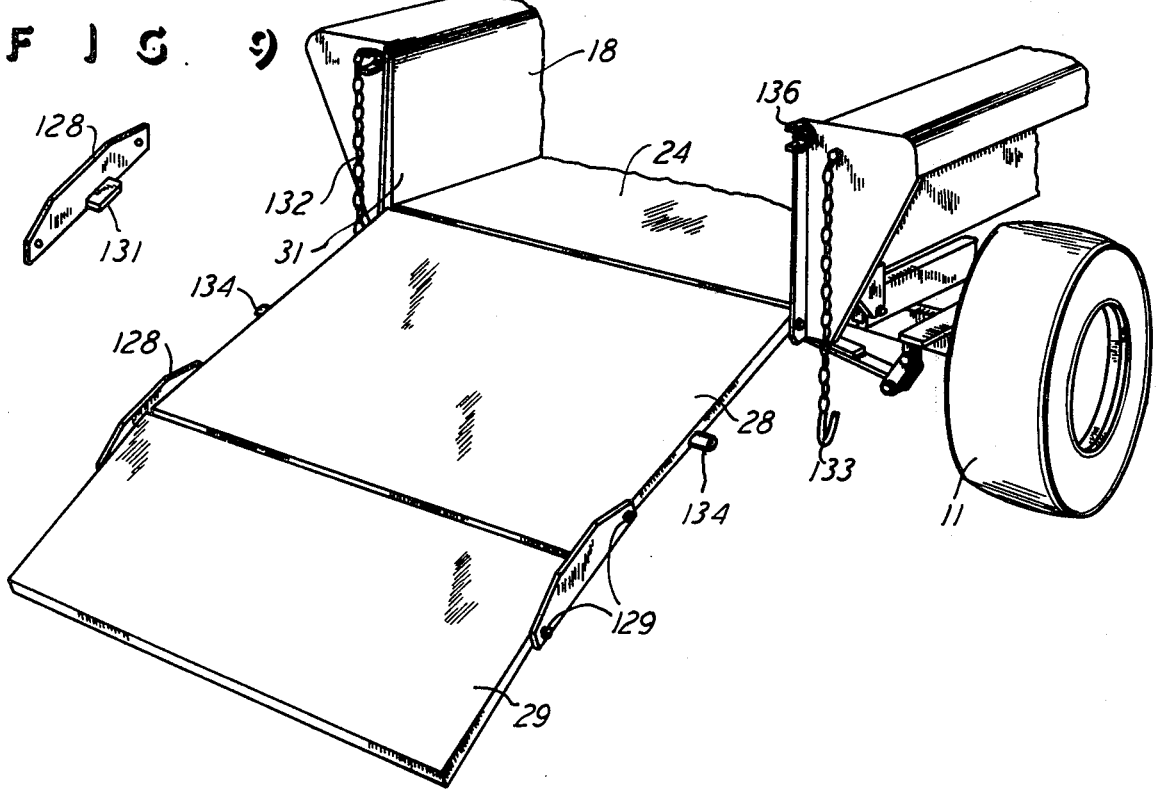
FIG. 9
FIG. 8

VEHICLE FRAME AND DRIVE TRAIN

This invention relates to a vehicle frame and drive train, and, more particularly, it relates to a utility type of vehicle which has a transmission and a differential for driving two rear wheels which are pivotally supported relative to the vehicle frame.

BACKGROUND OF THE INVENTION

Vehicle frames and drive trains are already known and exist in many different forms in the prior art. However, in the present invention, the vehicle frame and drive train pertain to a utility type of vehicle, such as a lawn and garden truck which can be used for transporting equipment and material. Therefore, the problems and considerations in the present invention include the provision of a vehicle which is suitable for movement over irregular terrain and for transporting equipment and hauling material, and yet have the vehicle lightweight, sturdy and durable in its construction, highly maneuverable for moving around and between natural obstacles, and having it inexpensive to manufacture and maintain. In accomplishing these objectives of simplicity of design and durability of structure, the vehicle of the present invention utilizes a transmission and a differential and drive elements extending therebetween and also extending to the driving wheels, and all of the aforementioned elements and members are sturdily mounted on the vehicle frame and are enclosed thereon to be protected from damage and to be conveniently mounted.

Still further, it is the object of the present invention to provide a vehicle which has the aforementioned attributes and which is arranged for ready and easy maintenance and repair, if and when such is needed. Further, the vehicle of this invention is capable of producing maximum horsepower and of performing in an optimum manner, though the vehicle is of a minimum size, weight, expense and complexity of elements, relative to the accomplishments of its normal functioning, as mentioned. In accomplishing these objectives, the frame of the vehicle of this invention is of a minimum cost and number of parts, though it is of maximum strength relative thereto, and likewise the drive train is of optimum utility in providing the desired drive speeds and drive forces, though the drive train elements are of only minimum weight, expense, and complexity. With regard to the drive train, an optimum drive reduction is utilized for producing the optimum drive torque, all by virtue of the particular drive mechanisms of the transmission and the differential and the drive connections to the driving wheels.

Other objects and advantages have become apparent upon reading the following description in light of the accompanying drawings.

BRIEF DESCRIPTION OF THE DRAWINGS

FIG. 7 is an exploded view of the shift lever and its linkage which connects to the transmission of the vehicle shown herein.

FIG. 8 is a rear perspective view of the vehicle shown in FIG. 1, but with the tailgate being in a lowered position.

FIG. 9 is a perspective view of a link connected to the tailgate.

DETAILED DESCRIPTION OF THE PREFERRED EMBODIMENT

Figure 1:
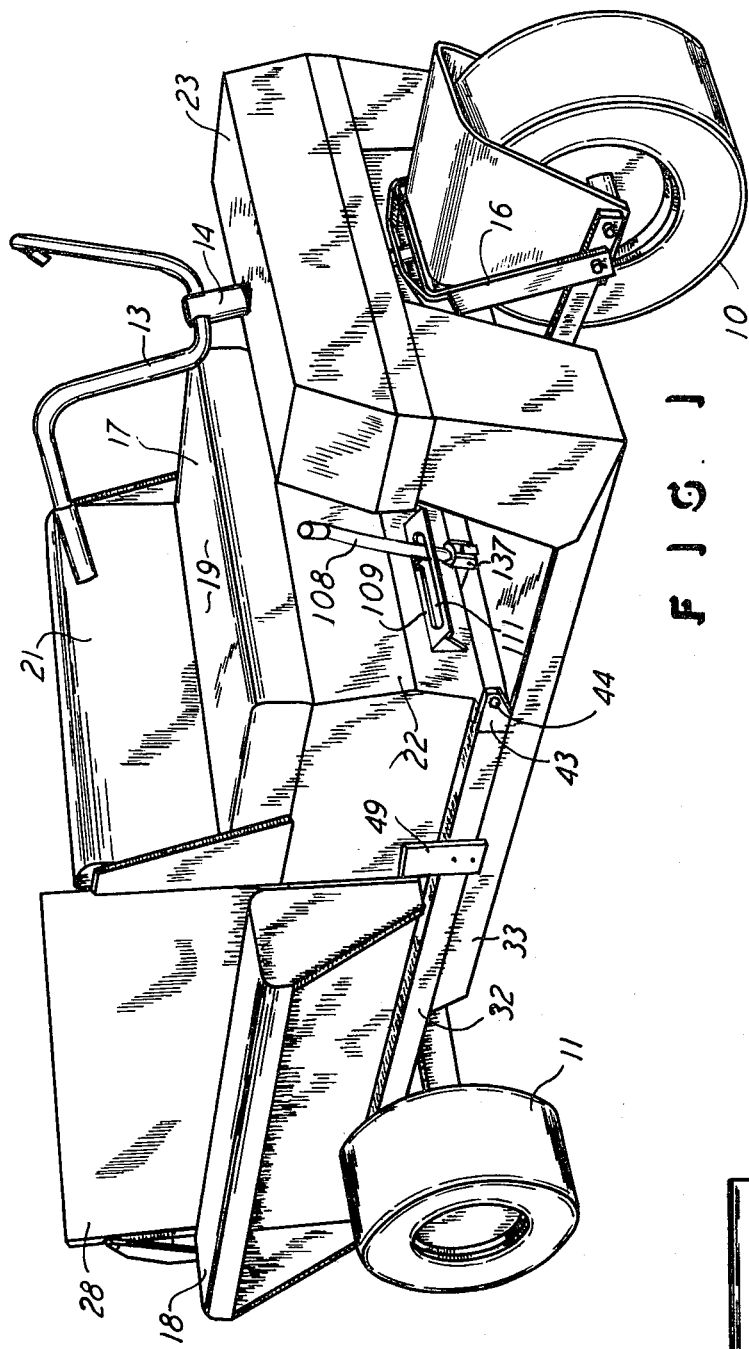
FIG. 1 is a front perspective view of a utility vehicle made according to this invention.

The drawings show that the vehicle of this invention is depicted as a three wheel vehicle having a front wheel 10 and two traction wheels 11 and 12 at the rear of the vehicle. Handlebars 13 are suitably supported on the vehicle, and they connect through the steering column 14 to a steering fork 16 which connects with the front wheel 10 for steering the same. The drawings further show that the vehicle includes an operator's seat 17 and a utility box 18 which can be used for hauling equipment or materials or the like. The operator's seat 17 includes the seat cushion 19 and the upstanding backrest 21, and it has a base designated 22. Also, the vehicle includes the upstanding portion 23 which is disposed forwardly of the operator's seat 17, and this portion 23 is suitably supported on the steering column 14 which in turn is suitably supported on the front ground wheel 10. Further, the vehicle hauling box 18 includes the bed or floor 24 and the upstanding sides 26 and the front wall 27. Also, a combined tailgate 28 and dock board 29 are pivotally mounted at the rear opening 31 of the box 18, and FIG. 8 indicates this arrangement.

Figure 5:
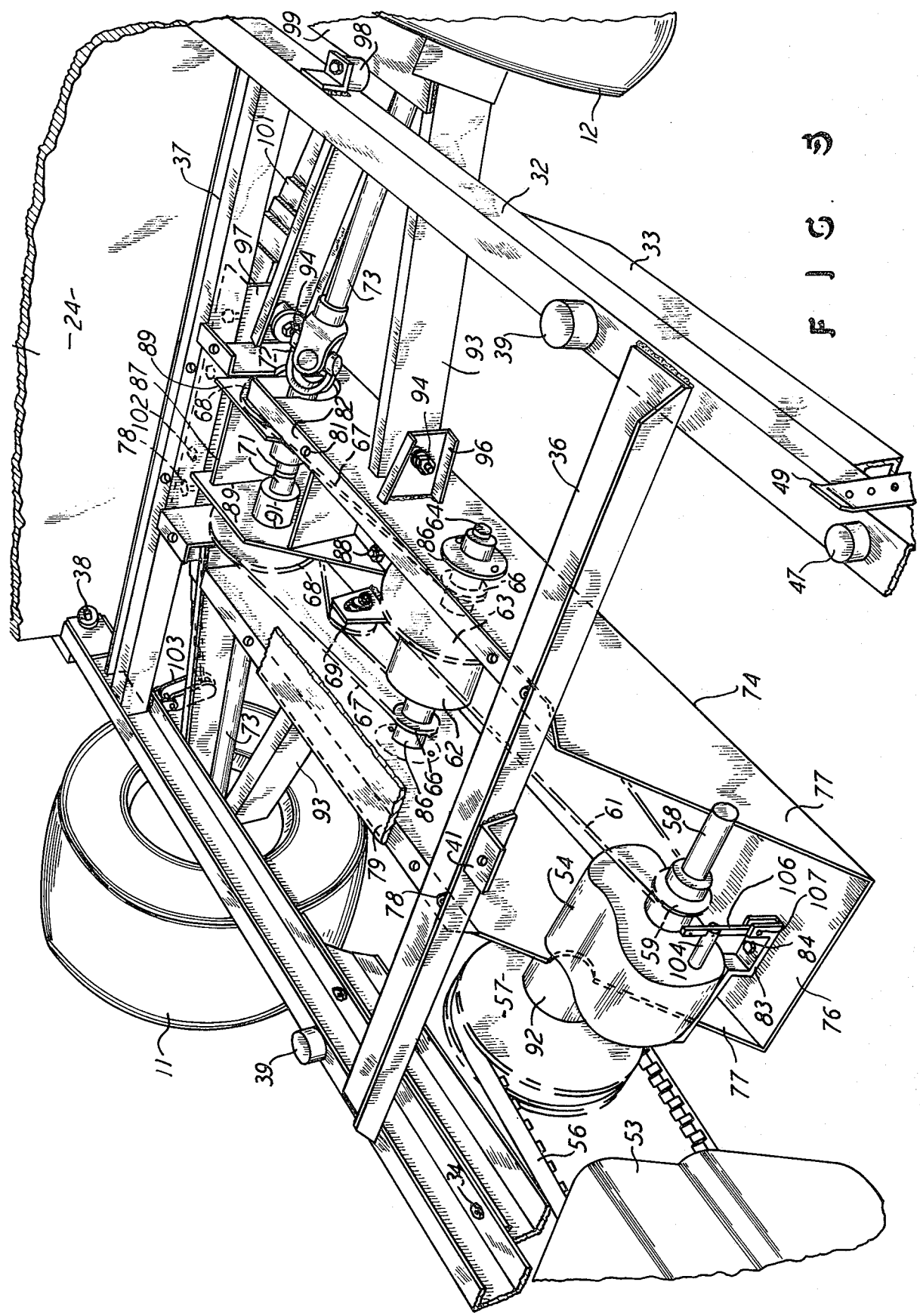
FIG. 5 is a front perspective view of the drive train of this vehicle, with the vehicle being fragmentarily shown and with the box being pivoted to its upright position from the position shown in the aforesaid views.

The vehicle frame includes the side rail pieces 32 and 33 which extend in the fore-and-aft direction of the vehicle and which are disposed in pairs on each side of the vehicle in the overlapped relationship shown. The rails 32 and 33 are secured together by bolts 34, as shown in FIG. 5. FIG. 5 further shows that the vehicle frame includes a forwardly disposed cross-rail 36 and a rearwardly disposed cross-rail 37, and these rails are suitably secured to the side-rails, such as by welding or bolting or the like. With this arrangement of the frame, the siderail 33 extends to a forward position on the vehicle and through the vehicle upstanding portion 23. Similarly, the side-rails 32 overlap with the rails 33 and extend rearwardly of the vehicle to a rearward point where a pivot bolt 38 is supported on the rear end of each of the side-rails 32, and the box 18 is pivotally mounted on the pivot bolts or pins 38. Therefore, the box 18 can pivot between the lowered position of FIG. 1 and the raised position shown in FIG. 5, and that would be a dumping position. To support and secure the box 18 in the lowered position, cushioned support blocks 39 are fixed to each of the siderails 32, and the box bed 24 rests on the supports 39, and also a bracket 41 is affixed to the frame cross-rail 36, and thus a bolt 42, as seen in FIG. 2, extends through the box bed 24 and into the bracket 41 to secure the box 18 in the lowered position shown in FIGS. 1 and 2.

Figure 2:
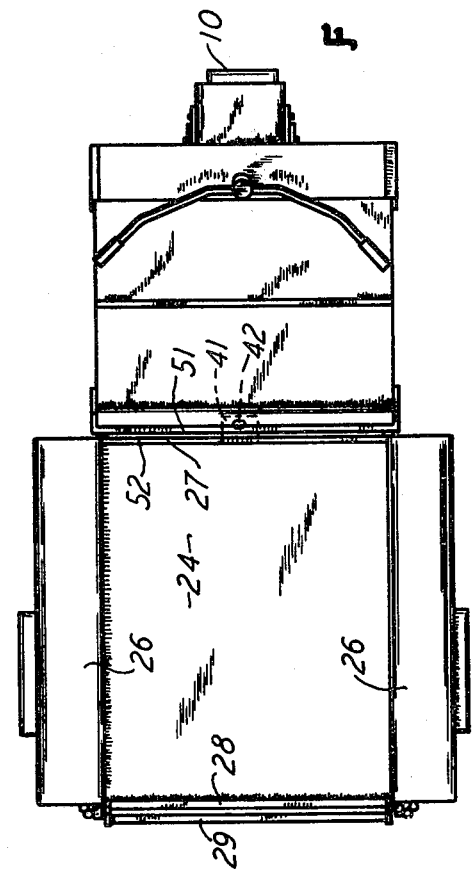
FIG. 2 is a top plan view of the vehicle shown in FIG. 1, but being on a reduced scale.
Figure 6:
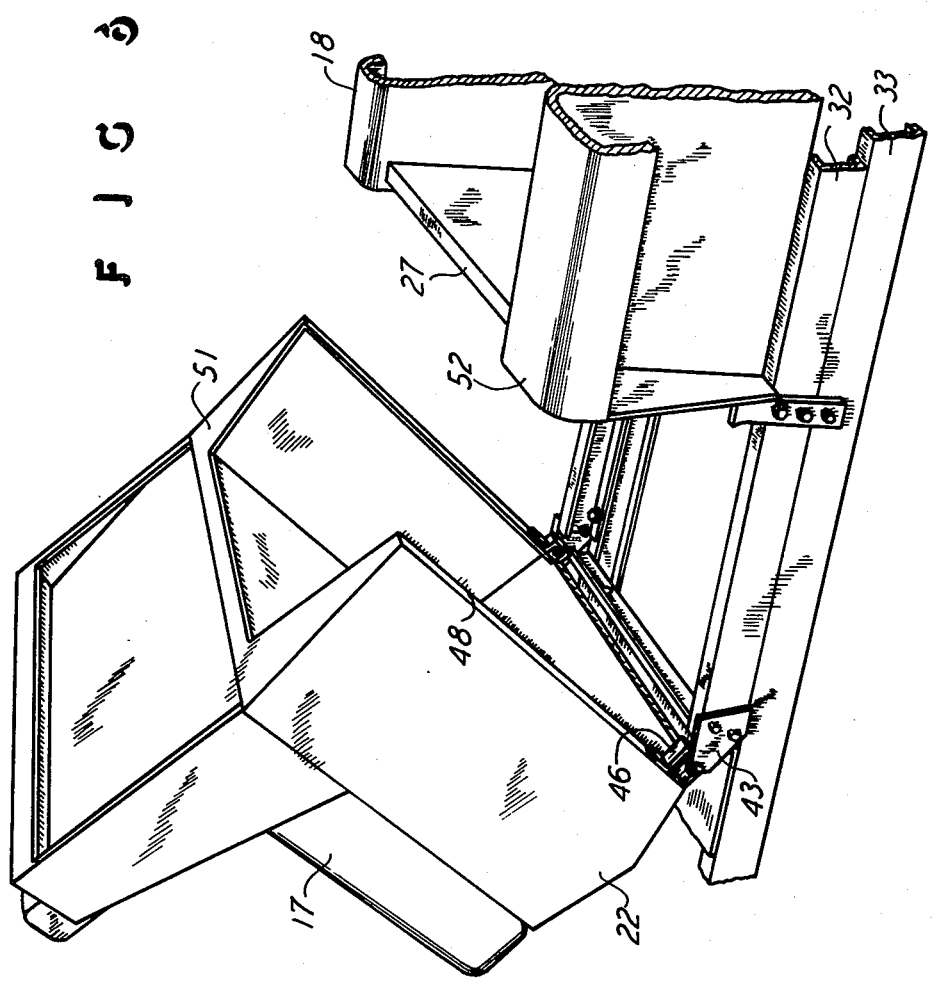
FIG. 6 is a rear perspective view of a fragment of the vehicle shown in FIG. 1, and with the operator's station being in its upward pivoted position.

The operator's seat 17 is also pivotally mounted on the frame, and FIGS. 1 and 6 show a pivot plate 43 affixed to the front end of each of the side-rails 32, and a pivot pin or bolt 44 extends through each plate 43 and engages a U-shaped bracket 46 on the seat portion 22 to thus pivotally mount the seat 17 relative to the frame so that the seat can pivot forwardly, as shown in FIG. 6. FIG. 5 again shows a cushioned support 47 affixed to the rail 32, and there would be one on each rail 32, and thus the seat 17 has a lower edge 48 which rests down on the cushion 47 in the lowered or operative position shown in FIG. 1. Also, a spring clip 49 is affixed to each of the pairs of the frame side-rails 32 and 33, and the clips 49 engage the seat portions 22 when the seat 17 is in the lowered position, and they thus releasably hold the seat in the lowered position but permit ready and easy pivoting of the seat 17 to the FIG. 6 position.

Figure 3:
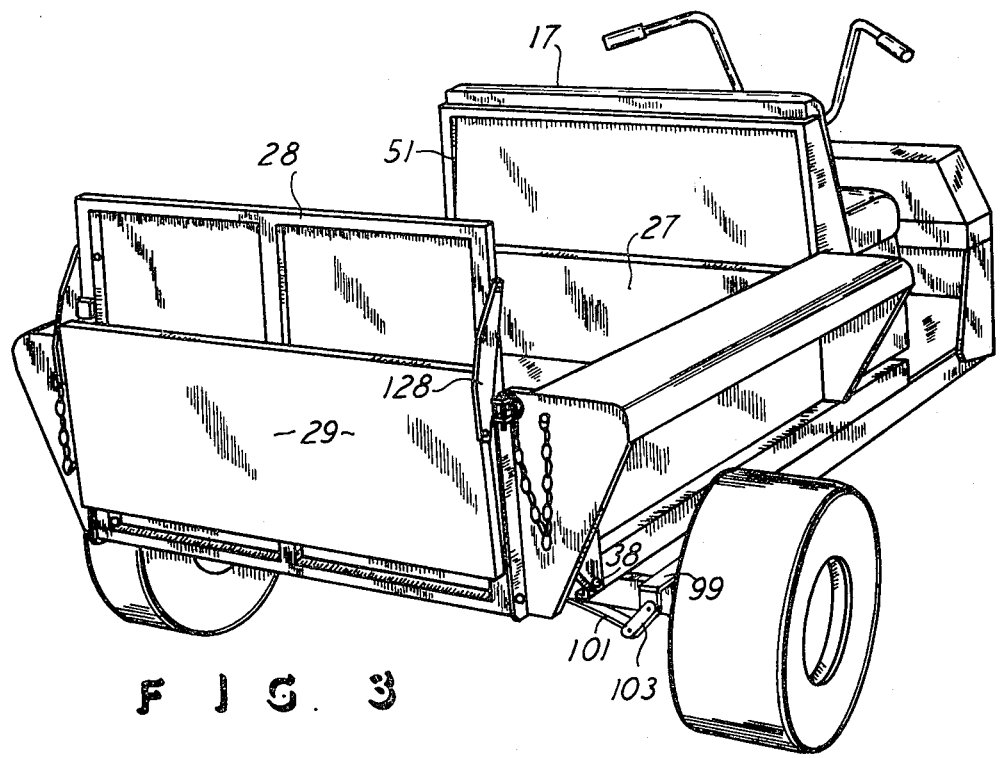
FIG. 3 is a rear perspective view of the vehicle of FIG. 1.
Figure 4:
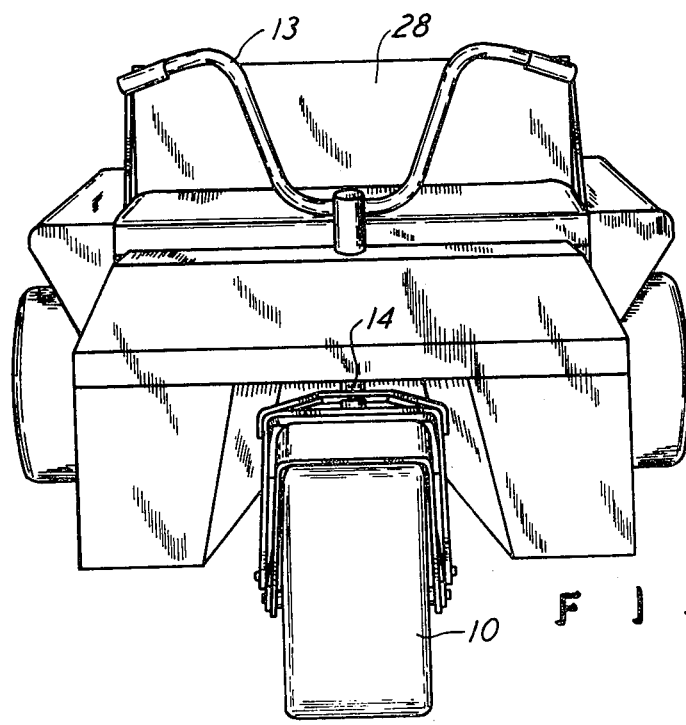
FIG. 4 is a front perspective view of the vehicle of FIG 1.

With the arrangement described, the seat 17 and the box 18 pivot upwardly and away from each other to expose the center lower portion of the vehicle, for the purpose of access or servicing the drive train or frame portions described herein. It should also be noticed that the seat 17 has an upright back surface 51, and the box 18 has an upright front surface 52, and these surfaces occupy juxtaposed positions in the lowered and operative positions of both, as shown in FIGS. 2 and 3.

FIG. 5 shows the drive mechanism and drive train for the vehicle, and it will here be seen that there is a gasoline engine fragmentarily shown at 53, and a transmission 54 is disposed rearwardly of the engine, relative to the fore-and-aft direction of the vehicle, and a belt 56 extends to a pulley 57 which is in driving relation with the transmission 54. The transmission 54 may be of a conventional gear type, and it has an output shaft 58 extending therefrom, and thus the transmission 54 is powered by the engine 53 and through the timing belt 56, and it will be seen that the pulley 57 is large, relative to the other drive train drive transmitting members being described herein. A small sprocket 59 rotates with the transmission output shaft 58, and the sprocket 59 has a chain trained thereon, and the chain is shown in dot-dash lines, as is the sprocket 59, and is designated 61. The drive train also includes a differential 62, and a large sprocket 63 is in driving relation with the differential 62 and receives the drive chain 61, all in a conventional arrangement of the differential 62 and of the drive between the transmission sprocket 59 and the differential sprocket 63. Thus, the differential 62 is of a conventional design, and it has its output shaft 64 drivingly engaged with two small sprockets 66 on the shaft 64, and each sprocket 66 has a chain 67 thereon, and the two chains 67 drivingly engage a large sprocket 68, and these sprockets 66 and 68 and the intervening chain 67 are shown in dot-dash lines and they are of a conventional arrangement of sprocket and chain. Also, each chain 67 has a chain tightener sprocket 69 engaged with the chains 67 for retaining the desired tension in the chains 67, in a conventional arrangement of sprocket and chain.

Two spaced-apart shafts 71 are coaxially disposed at the rear end of the vehicle, and the laterally outward end of each shaft 71 has a U-joint 72 thereon. The shafts 71 are driven by their respective sprockets 68, and each shaft 71 has a U-joint 72, one on each end of its respective shaft 71, and the U-joints 72 in turn are in respective rotational driving relation with a rear axle 73 on each side of the vehicle. The two axles 73 respectively drivingly engage the rear traction wheels 11 and 12, in any conventional manner.

Therefore, with the drive train elements described, the power from the engine 53, and on through the drive train and to the ground engaging rear traction wheels 11 and 12, can be understood and traced. In this arrangement, the vehicle has a U-shaped pan member 74 which has a lower and horizontally disposed floor section 76 and two upright side portions 77. The member 74 supports and encloses the drive train from the transmission 54 and through the two shafts 71. The member 74 is suitably secured to the cross-rails 36 and 37, such as by bolts 78, and the member 74 has a top cover 79 which extends fully between the upper edges of the sides 77 and which extends fully between the cross-rails 36 and 37, and thus the cover 79 completely closes the top of the pan member 74 and thereby protects and covers much of the drive train described. The cover 79 is secured to the pan member 74 by bolts which can extend through the bolt holes 81 on the upper flanges 82 of the pan member 74.

With regard to mounting and supporting the drive train members within and by the pan member 74, the transmission 54 is suitably supported thereon by means of a bracket 83 and bolts, such as the bolt 84. A rotation supporting bearing 86 is suitably affixed to each sidewall 77 of the pan 74, and these bearings 86 rotatably support the differential shaft 64. Another U-shaped member 87 is disposed within the larger U-shaped member 74 and is at the rear of the member 74 and is secured thereto by means of bolts, such as the bolt 88. The member 87 has upstanding sidewalls 89, and these walls receive and support rotation bearings 91 on each wall 89, and the bearings 91 in turn rotatably receive and support the axle shafts 71.

With the arrangement shown and described, it will therefore be seen and understood that the drive train members are affixed to the pan member 74, and even the pulley 57 is affixed thereto since it is affixed with the transmission 54 through the portion designated 92. It will be further seen and understood that the arrangement provides protection for the drive train, with regard to the movement of the vehicle over rough terrain and the like and with regard to other hazards common to utility trucks. Further, the drive train provides a speed reduction from the pulley 57 and to the shafts 71, and it therefore results in a large driving torque for the vehicle, and this advantage is achieved by virtue of the sizes of the pulley 57 and the sprockets 59 and 63 and 66 and 68, with the sprockets 59 and 66 being of diameters smaller than the diameters of the sprockets 63 and 68, and thus the speed reduction and torque increase are achieved. Thus the arrangement presents the two coaxial and spaced-apart bearings 86 and the two coaxial and spaced-apart bearings 91 which are disposed and supported relative to the pan member 74, and also the bearings 91 are described as rotatably supporting the axle shafts 71 and 73. Also, the several sprockets and sprocket chains described constitute the drive connections extending from the transmission to the differential and to the axles, all for driving the traction wheels 11 and 12 from the engine 53. Further, the vehicle box 18 has its floor 24 extending adjacent to and only immediately above the horizontal plane of the frame side-rails 32 and the drive train members which are disposed within the pan 74. Also, the U-joints 72 and axles 73 are all enclosed and covered by the floor 24 of the vehicle box 18, but the pivotal box 18 makes them readily accessible when protection of these parts is not required and the box 24 is tipped up for access to the parts therebelow.

FIG. 5 further shows that the rear wheels 11 and 12 are suitably supported on the V-shaped members 93 which have their spaced-apart and inner ends pivotally mounted on bolts 94 which extend through brackets 96 and the pan rear wall 97, on each side of the pan 74. Thus the pivot bolts 94 are on the axis of the operation of the U-joints 72, on each side of the pan 74, and thus the wheel axles 73 can move up and down, along with the up and down pivotal movement of the V-shaped frame members 93, and all will still retain respective and desired connection with the respective rear wheels 11 and 12. Further, a cushion support 98 is affixed to each side-rail 32 and it abuts a plate 99 affixed to the outer ends of each V-shaped frame member 93, and thus the upward pivotal movement of the V-shaped frame members 93 is limited by the bumper or cushion member 98. Further, a leaf spring 101 is attached through bolts 102 to the frame rear cross piece 37, and the opposite ends of the leaf spring 101 connects to the respective plates 99 by means of links 103, as shown in FIGS. 3, 5, and 8. With this arrangement, the vehicle frame is upwardly supported on the spring 101 and thus through the ground engaging wheels 11 and 12, and the frame is resiliently supported in that manner. Of course the side of the vehicle opposite to that side shown in FIG. 5 has the same mounting for the wheel 11 as that shown for wheel 12, including the mounting of the V-shaped frame member 93.

FIGS. 1 and 7 show that the operator has control over the setting of the conventional type of transmission 54, and it will be noted in FIG. 5 that the transmission 54 has a plunger member 104 which can move in and out of the transmission 54 for setting the transmission at the desired vehicle ground speeds. An upstanding link 106 is pivotally connected with the member 104 and is pivoted about a pin 107 on the support bracket 83, as seen in FIG. 5. The transmission linkage extends from the upstanding member 106 and to a shift lever 108 seen in FIG. 1 and which is available to the operator since it is on the operator's seat 17 and is controlled thereby by the guide 109 having a laterally and horizontally disposed slot 111 along which the lever 108 can move in the shifting of the vehicle.

FIG. 7 shows the seat bracket member 109 which is affixed to the seat portion 22, and it shows the lever 108 which is connected to a rod 112 which in turn is supported on the vehicle stationary piece 113, and thus the rod 112 can rotate about its longitudinal axis, by virtue of lateral movement of the shift lever 108. In turn, an upstanding link 114 is pivoted laterally of the vehicle, and it connects to a rod 116 through a fork 117, and the rod 116 also engages an upstanding link 118 which is affixed to another rod 119 extending longitudinally of the vehicle and which is supported on the affixed and stationary vehicle portion 121. In turn, the rod 119 has its rear end engaged with a sleeve 122 which is affixed to a link 123 which in turn engages a pin 124, and it is the pin 124 which engages the transmission upstanding link 106. In this manner, the operator can move the shift lever 108 from side to side, that is along the slot 111, and this will rotate the arm or link 114 and in turn longitudinally displace the link 116 and in turn rotate the link or arm 118 and in turn rotate the rod 119 about its longitudinal axis. Consequently, the arm or link 123 is rotated to displace the U-shaped connecting pin 124 which in turn moves the upstanding link 106 and thus moves the transmission plunger 104 into a selected position for varying the rotational speed of the transmission output shaft 58, all as desired. Therefore, the rear end of the rod 119 engages the sleeve 122 by means of a pin 126, and the sleeve 122 is rotatably supported on the vehicle stationary member 127. It will be further seen and understood that the shift lever 108 is curved, and thus the seat 17 can tip forwardly about its pivot bolts 44, and the lever 108 will not prevent the tipping action, since the curvature of the lever 108 is in the fore-and-aft plane of the vehicle and that is the plane in which the seat 17 can tip or pivot, and this is also achieved by virtue of the slot 111 which permits the sliding of the bracket 109 up and down on the lever 108 during the pivot action of the seat 17.

FIGS. 8 and 9 show the arrangement of the combined tailgate 28 and dock or ramp board 29, and here it will be seen that they are in the extended position and thus implements, such as lawnmowers, snow throwers, small tractors, or other wheeled or movable machines or items can be moved up and down on the extended ramp formed by the tailgate 28 and the extension portion 29. A link 128 is pivotally connected to the boards 28 and 29 by means of bolts 129, and the links 128 have support tangs 131 which are disposed underneath the boards 28 and 29 when the latter are in the FIG. 8 position, and thus upward support of the boards 28 and 29 is achieved. Also, a chain 132 is attached to each side of the box 18, and each chain has a hook 133 on the extending end thereof, and the hook can engage the pin 134 on each side of the tailgate 128, and thus the chains 132 will hold the board 28 in the upward position as shown in FIG. 8 for supporting the weight being moved over the board 28. Also, the side pins 134 extend into clevises 136 affixed to the box 18 when the tailgate board 28 is in the upright position shown in FIG. 3, for instance, and then the hooks 133 can extend through the openings which would exist in the ends of the U-shaped clevises 136, and thus the tailgate 28, and the ramp board 29 are secured in the closed or upright position on the box 18 for transport and hauling as in the position shown in FIG. 3.

Thus is will be understood that the engine 53 is supported by the frame described, in any suitable manner, and it will be seen that the pan member 74 is elongated in the fore-and-aft direction of the vehicle and presenting the full and complete support for the drive train members described. Also, the drive train members are sequentially disposed on a horizontal plane, with the transmission 54 being furthest forward, and with the differential 62 being rearward of the front cross-rail 36 and with the axles 73 being forward of the rear cross-rail 37. Further, the axles 71 and 73 include the U-joints 72, and thus the axles are articularly supported from the bearings 91 which in turn receive their support through the pan member 74 which includes the U-shaped support piece 87. Also, the shift lever 108 is pivoted to rod 112 through a pin 137 which permits the lever 108 to pivot in the tractor fore-and-aft direction, along with the pivot of the seat 17, while rendering the lever 108 and 112 rotatably connected together.

What is claimed is:

1. A vehicle frame and drive train assembly for a vehicle, comprising a vehicle frame, an engine supported by said frame, a transmission supported by said frame and being in driven relation with said engine, a U-shaped pan member attached to said frame and being elongated in the fore-and-aft direction of the vehicle, two rotation bearings mounted on said pan member in axially aligned positions with each other and on respective opposite sides of said U-shaped pan member, a differential having a shaft rotationally supported in said bearings, two additional rotation bearings supported by said pan member in axially aligned positions with each other and disposed relative to respective opposite sides of said U-shaped pan member and rearwardly of said differential with respect to the fore-and-aft direction of the vehicle, a wheel axle rotatably supported by each of said additional rotation bearings and extending therefrom to respective opposite sides of the vehicle, a ground-engaging wheel connected with the extending end of each of said axles, and drive connections extending from said transmission to said differential and from said differential to said axles, for driving said wheels.

2. The vehicle frame and drive train as claimed in claim 1, wherein said drive connections from said transmission to said axles consist of sprockets and chains, with said axles each having a sprocket thereon and with said differential shaft having three sprockets with one thereof being driven through said transmission and with the remaining two thereof respectively being in driving relation with said sprockets on said axles.

3. The vehicle frame and drive train as claimed in claim 1, wherein said frame includes two spaced-apart side rails and two spaced-apart cross rails extending between said side rails, with one of said cross rails disposed forward of said differential and the other of said side rails disposed rearward of said axles, both forward and rearward being relative to the fore-and-aft direction of the vehicle, said U-shaped pan member being attached to said cross rails and extending therebetween, and a cover attached to said pan member to cover said differential and said drive connections.

4. The vehicle frame and drive train as claimed in claim 1, wherein said transmission is mounted on and attached to said U-shaped pan member, and wherein said drive connections from said transmission and to said differential and to said axles are all arranged with members which produce a speed reduction and an increased driving torque.

5. The vehicle frame and drive train as claimed in claim 1, including a V-shaped frame member pivotally mounted on each side of said U-shaped pan member and extending therefrom to a respective one of said wheels for supporting said frame on said wheels, and said axles being respectively articularly supported from said additional bearings for pivotal action about the respective axes of pivot of said V-shaped frame members.

6. The vehicle frame and drive train as claimed in claim 5, including a spring support mounted on said frame and connected to the extending end of each of said V-shaped frame members for resiliently supporting the vehicle on said wheels.

7. The vehicle frame and drive train as claimed in claim 6, wherein said vehicle is a three wheel vehicle and includes a third ground-engaging wheel disposed at and supporting the front of the vehicle.

8. The vehicle frame and drive train as claimed in claim 1, including a truck box mounted on said frame and having a bed portion extending over said U-shaped pan member and to a location over said transmission, to cover the drive train of the vehicle.

9. The vehicle frame and drive train as claimed in claim 1, wherein said frame includes two spaced-apart side rails extending rearwardly of the vehicle, a truck box pivotally mounted on the rearwardly extending ends of said side rails, for pivotal movement up to a dumping position, and said box including a bed portion extending over said U-shaped pan member, to be in a pivotally lowered position for hauling and for covering the aforesaid drive train members.

10. The vehicle frame and drive train as claimed in claim 1, including an operator's seat supported by said frame, and a transmission shift lever and linkage connected with said transmission and extending to a location adjacent said operator's seat, and including a truck box supported on said frame, and said operator's seat and said truck box being pivotal on said frame for exposing the aforesaid drive train parts.

* * * * *